(12) United States Patent
Shen et al.

(10) Patent No.: US 9,734,434 B2
(45) Date of Patent: Aug. 15, 2017

(54) FEATURE INTERPOLATION

(71) Applicant: Adobe Systems Incorporated, San Jose, CA (US)

(72) Inventors: Xiaohui Shen, San Jose, CA (US); Zhe Lin, Fremont, CA (US); Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/183,629

(22) Filed: Jun. 15, 2016

(65) Prior Publication Data

US 2016/0292537 A1  Oct. 6, 2016

Related U.S. Application Data

(62) Division of application No. 14/335,059, filed on Jul. 18, 2014, now Pat. No. 9,424,484.

(51) Int. Cl.

| | |
|---|---|
| *G06K 9/00* | (2006.01) |
| *G06K 9/62* | (2006.01) |
| *G06K 9/46* | (2006.01) |
| *G06F 17/30* | (2006.01) |
| *G06N 5/04* | (2006.01) |
| *G06N 99/00* | (2010.01) |

(52) U.S. Cl.
CPC ..... *G06K 9/6256* (2013.01); *G06F 17/30247* (2013.01); *G06F 17/30253* (2013.01); *G06K 9/46* (2013.01); *G06K 9/469* (2013.01); *G06K 9/4676* (2013.01); *G06N 5/04* (2013.01); *G06N 99/005* (2013.01)

(58) Field of Classification Search
CPC ............... G06K 9/4671; G06K 9/4676; G06K 9/6256–9/6259; G06F 17/30247–17/30262
See application file for complete search history.

(56) References Cited

U.S. PATENT DOCUMENTS

| | | | |
|---|---|---|---|
| 7,206,461 B2 | 4/2007 | Steinberg et al. | |
| 8,498,455 B2 | 7/2013 | Ke et al. | |
| 8,880,563 B2 | 11/2014 | Lin et al. | |
| 9,190,026 B2 | 11/2015 | Yang et al. | |
| 9,424,484 B2 | 8/2016 | Shen et al. | |
| 9,471,828 B2 | 10/2016 | Shen et al. | |
| 2003/0033347 A1 | 2/2003 | Bolle et al. | |
| 2003/0053685 A1 | 3/2003 | Lestideau | |
| 2003/0147558 A1 | 8/2003 | Loui et al. | |

(Continued)

OTHER PUBLICATIONS

"Notice of Allowance", U.S. Appl. No. 14/444,560, Jun. 1, 2016, 12 pages.

(Continued)

*Primary Examiner* — Aaron W Carter
(74) *Attorney, Agent, or Firm* — Wolfe-SBMC

(57) ABSTRACT

Feature interpolation techniques are described. In a training stage, features are extracted from a collection of training images and quantized into visual words. Spatial configurations of the visual words in the training images are determined and stored in a spatial configuration database. In an object detection stage, a portion of features of an image are extracted from the image and quantized into visual words. Then, a remaining portion of the features of the image are interpolated using the visual words and the spatial configurations of visual words stored in the spatial configuration database.

20 Claims, 10 Drawing Sheets

(56) References Cited

U.S. PATENT DOCUMENTS

| | | |
|---|---|---|
| 2005/0271279 A1 | 12/2005 | Fujimura et al. |
| 2007/0122056 A1 | 5/2007 | Steinberg et al. |
| 2007/0214172 A1 | 9/2007 | Nister et al. |
| 2008/0219558 A1 | 9/2008 | Lu et al. |
| 2008/0301133 A1 | 12/2008 | Brown et al. |
| 2009/0060351 A1 | 3/2009 | Li et al. |
| 2009/0208118 A1 | 8/2009 | Csurka |
| 2010/0046830 A1 | 2/2010 | Wang et al. |
| 2010/0226564 A1 | 9/2010 | Marchesotti et al. |
| 2011/0299743 A1 | 12/2011 | Ke et al. |
| 2012/0045132 A1 | 2/2012 | Wong et al. |
| 2012/0177294 A1 | 7/2012 | Ke et al. |
| 2012/0221572 A1 | 8/2012 | Wang et al. |
| 2012/0290577 A1 | 11/2012 | Cai et al. |
| 2013/0121600 A1 | 5/2013 | Lin et al. |
| 2013/0132377 A1 | 5/2013 | Lin et al. |
| 2013/0148881 A1 | 6/2013 | Xue |
| 2013/0148903 A1 | 6/2013 | van Zwol et al. |
| 2014/0105505 A1 | 4/2014 | Ioffe et al. |
| 2014/0254923 A1 | 9/2014 | Vidal Calleja et al. |
| 2014/0272822 A1 | 9/2014 | Yang et al. |
| 2015/0146989 A1 | 5/2015 | Shiiyama et al. |
| 2016/0019440 A1 | 1/2016 | Shen et al. |
| 2016/0027181 A1 | 1/2016 | Shen et al. |
| 2016/0371538 A1 | 12/2016 | Shen et al. |

OTHER PUBLICATIONS

"Non-Final Office Action", U.S. Appl. No. 14/444,560, Nov. 20, 2015, 12 pages.

Li,"Efficient Boosted Exemplar-based Face Detection", CVPR 2014, 2014, 8 pages.

Shen,"Object Retrieval and Localization with Spatially-Constrained Similarity Measure and k-NN Re-Ranking", IEEE Conference on Computer Vision and Pattern Recognition (CVPR), Jun. 16-21, 2012, Jun. 16, 2012, 8 pages.

Shen,"Detecting and Aligning Faces by Image Retrieval", IEEE Conference on Computer Vision and Pattern Recognition (CVPR), 2013, pp. 4321-4328.

Zhu,"Face Detection, Pose Estimation, and Landmark Localization in the Wild", 2012 IEEE Conference on Computer Vision and Pattern Recognition, 2012, 8 pages.

"Corrected Notice of Allowance", U.S. Appl. No. 14/444,560, Sep. 16, 2016, 3 pages.

"First Action Interview Office Action", U.S. Appl. No. 15/183,629, Jan. 12, 2017, 3 pages.

FEATURE INTERPOLATION

RELATED APPLICATIONS

This application is a divisional of and claims priority under 35 U.S.C. §120 to U.S. patent application Ser. No. 14/335,059, filed Jul. 18, 2014, entitled "Feature Interpolation," the disclosure of which is incorporated by reference herein in its entirety.

BACKGROUND

Conventional object detection applications extract a significant number of multi-scale features from an image in order to enable detection of an object in the image. For example in face detection, conventional solutions may extract approximately 200,000 features in an image with a maximum dimension of 1480. It is to be appreciated that extracting such a high number of features can be very time consuming, and thus becomes the bottleneck of conventional object detection methods in terms of speed.

SUMMARY

Feature interpolation techniques are described. In a training stage, features are extracted from a collection of training images and quantized into visual words. Spatial configurations of the visual words in the training images are determined and stored in a spatial configuration database.

In an object detection stage, a portion of features of an image are extracted from the image and quantized into visual words. Then, a remaining portion of the features of the image are interpolated using the visual words and the spatial configurations of visual words stored in the spatial configuration database.

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
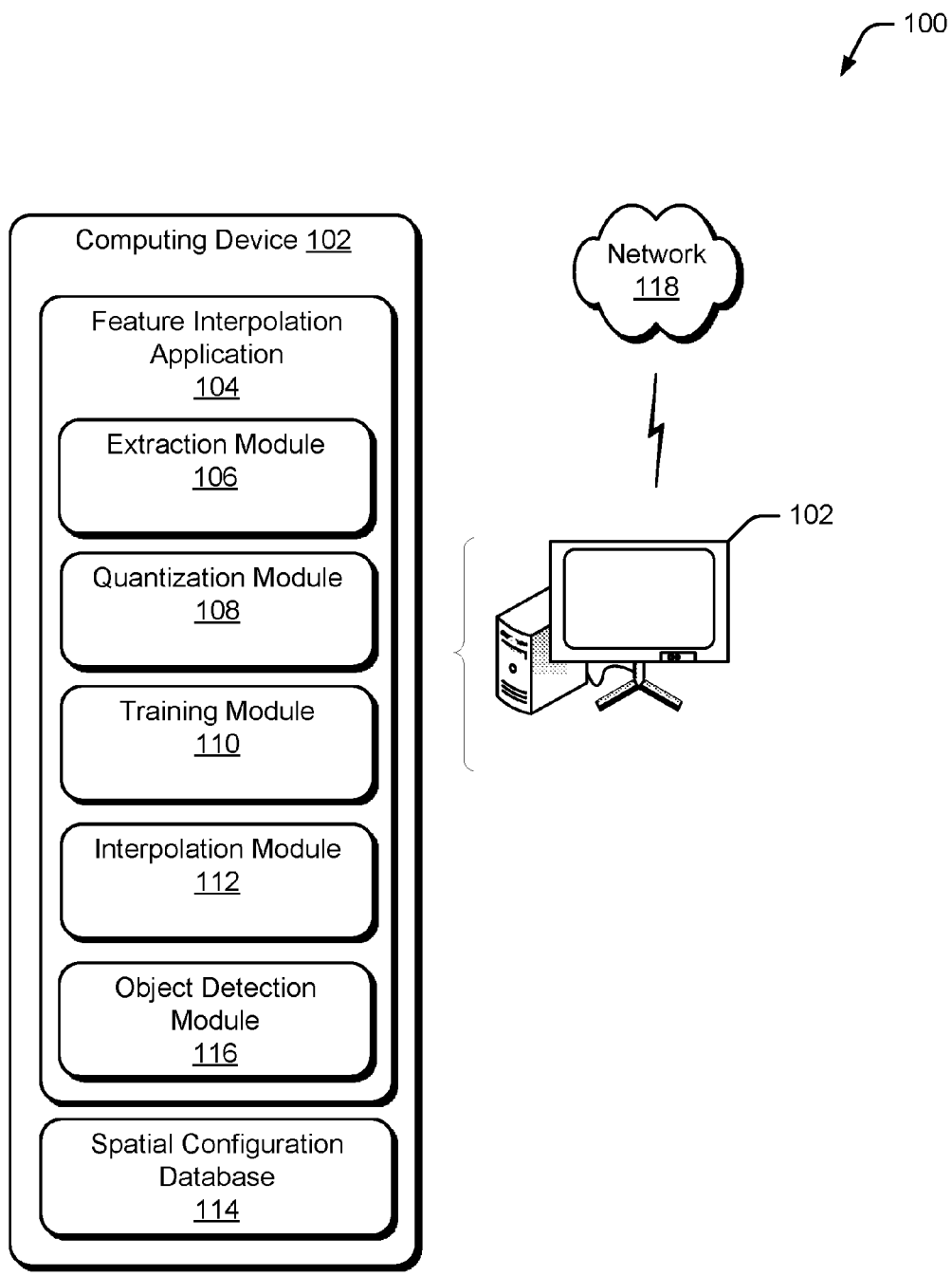
FIG. 1 illustrates an environment in an example implementation that is operable to employ techniques described herein.

Search-based detection methods treat object exemplars (e.g., face images for face detection) as weak classifiers, and leverage bag-of-words-based retrieval techniques for fast feature matching between the exemplars and the test image. In this framework, a vocabulary is first built by clustering a large number of features extracted from multiple example images. Each cluster is composed of similar features, and the center of each cluster is called a visual word. For each exemplar image, features are extracted at multiple scale levels, and then quantized through the vocabulary (e.g., represented by their closest visual words in the vocabulary). The quantized features can then be stored using an inverted file technique.

In the object detection stage, the same feature extraction and quantization process is performed on the test image. A voting-based method is then used to match the quantized features, and calculate the similarity between any sub-rectangle inside the test image and any exemplar image. The similarity can then be accumulated from different exemplars with discriminative thresholding, to indicate the possibility of being the target object for any particular sub-rectangle in the test image.

Conventional object detection applications extract a significant number of multi-scale features from an image in order to enable detection of an object in the image. For example in face detection, conventional solutions may extract approximately 200,000 features in an image with a maximum dimension of 1480. It is to be appreciated that extracting such a high number of features can be very time consuming, and thus becomes the bottleneck of conventional object detection methods in terms of speed.

This disclosure describes feature interpolation techniques to extract a portion of features of an image, and to use the extracted features to interpolate a remaining portion of features of the image.

Consider, for example, a first image which contains a region R containing the quantized visual words A, B, C, D and E, where E is positioned in the center of the region, A is positioned above E, B is positioned to the right of E, C is positioned below E, and D is positioned to the left of E. Note that similar objects have similar appearances, and usually share similar features. Thus, if a second image is received that includes a region that contains A, B, C, and D with the same spatial configuration as in the first image, it is highly possible that the region is similar to region R of the first image. Thus, it is also very likely that the center feature would be quantized to E.

Therefore, in a training stage, the feature interpolation techniques obtain and store spatial structures of the features from a collection of training images. To do so, neighbor lists can be generated and stored for each visual word. Then, in the testing stage, once a portion of the features are extracted from the test image (e.g., A, B, C and D), the interpolation techniques locate the stored spatial structures and predict the missing features (e.g., E).

By reducing the number of features that are extracted, the interpolation techniques significantly speed up the feature extraction process, while still enabling accurate object detection. For example, the interpolation techniques described herein may extract approximately 50%, or even 25%, of the original features in an image, and use this portion of extracted features to interpolate the remaining features, while achieving similar object detection performance as conventional solutions that extract more features.

Example Environment

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 10.

Computing device 102 is illustrated as including a feature interpolation application 104. Feature interpolation application 104 is representative of functionality to perform one or more techniques to interpolate features based on extracted features.

Feature interpolation application 104 includes an extraction module 106 and a quantization module 108. Extraction module 106 is configured to extract features from an image. As described herein, the term "features" correspond to interesting points of an image that can be extracted from the image to provide a feature description of the image. The feature description can then be used to locate objects (e.g., faces) in the image.

Quantization module 108 is configured to receive extracted features from extraction module 106, and to quantize the extracted features in a visual word. To quantize the extracted features into visual words, quantization module 108 represents the features by their closest visual word in a feature vocabulary.

Feature interpolation application 104 further includes a training module 110 that is configured to obtain and store spatial configurations of features extracted from a collection of training images in a spatial configuration database 114. Further discussion of training module 110 can be found in FIG. 2.

Feature interpolation application 104 further includes an interpolation module 112 that is configured to receive a portion of extracted features from an image, and interpolate remaining (e.g., non-extracted) features of the image using the spatial configurations stored in spatial configuration database 114. Further discussion of the interpolation module 112 can be found in FIG. 4.

Feature interpolation application 104 may further include an object detection module 116 that is configured to detect objects in images based on features extracted by extraction module 106 and interpolated features generated by interpolation module 112. In one or more implementations, object detection module 116 is an exemplar-based face detection classifier that is configured to detect faces in images. It is too be appreciated, however, that object detection module 116 may be implemented as any type of classifier, such as a histogram classifier, a support vector machine (SVM) classifier, or any other machine-running classifier.

It is to be appreciated that feature interpolation application 104 may be used in other applications besides object detection. For example, in one or more implementations feature interpolation application can be implemented in a visual search application where areas of two images are matched. For example, features may be extracted by interpolation module 112 from an area of a first image. Then, additional features may be extracted by interpolation module 112 from multiple test images in order to locate a second image that with similar features as the area of the first image.

Figure 10:
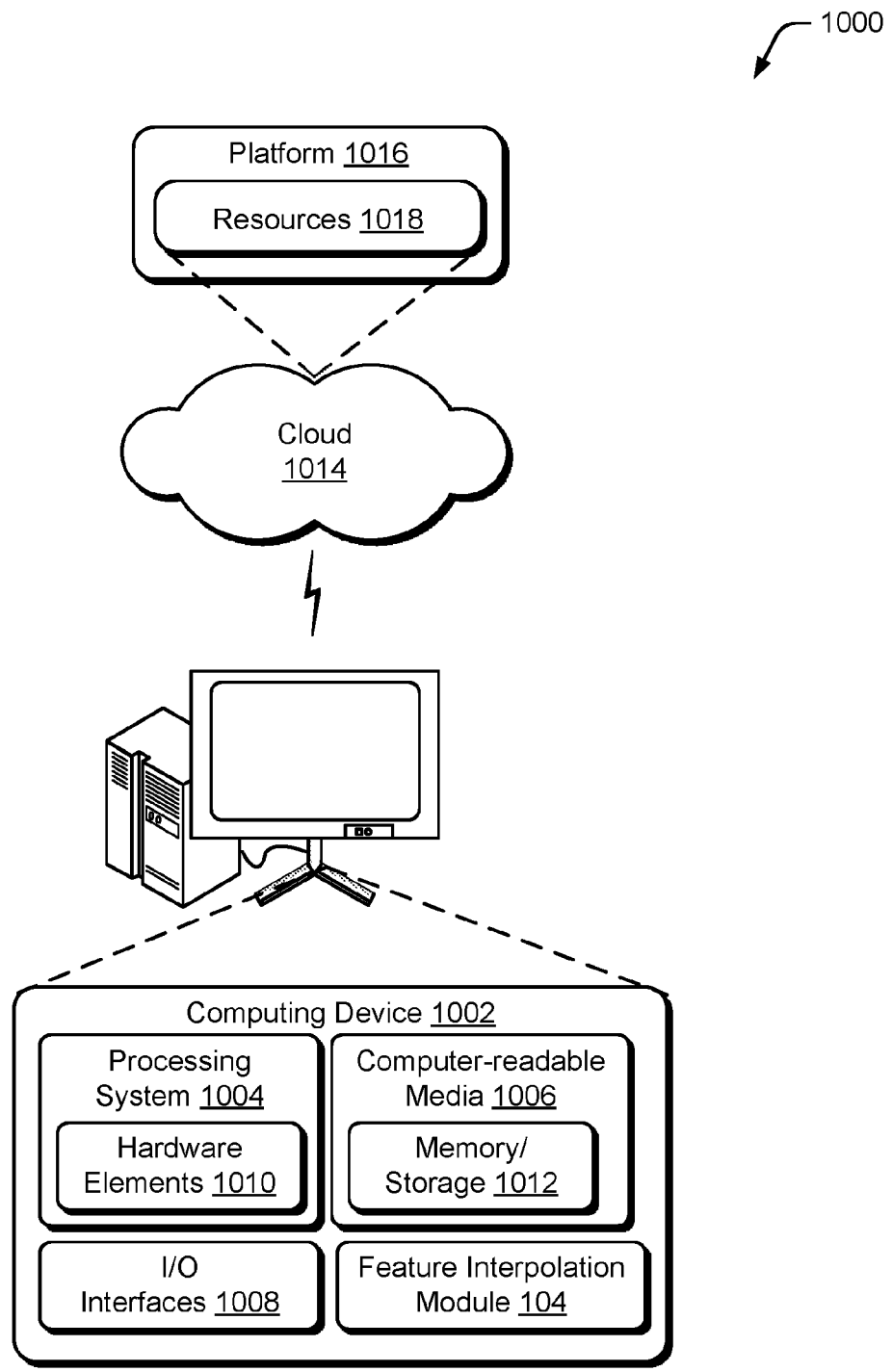
FIG. 10 illustrates an example system including various components of an example device that can be implemented as any type of computing device as described and/or utilized with reference to FIGS. 1-9 to implement embodiments of the techniques described herein.

Although illustrated as part of computing device 102, functionality of the feature interpolation application 104 may also be implemented in a distributed environment, remotely via a network 118 (e.g., "over the cloud") as further described in relation to FIG. 10, and so on. Although network 118 is illustrated as the Internet, the network may assume a wide variety of configurations. For example, network 118 may include a wide area network (WAN), a local area network (LAN), a wireless network, a public telephone network, an intranet, and so on. Further, although a single network 118 is shown, network 118 may also be configured to include multiple networks.

Training Stage

Figure 2:
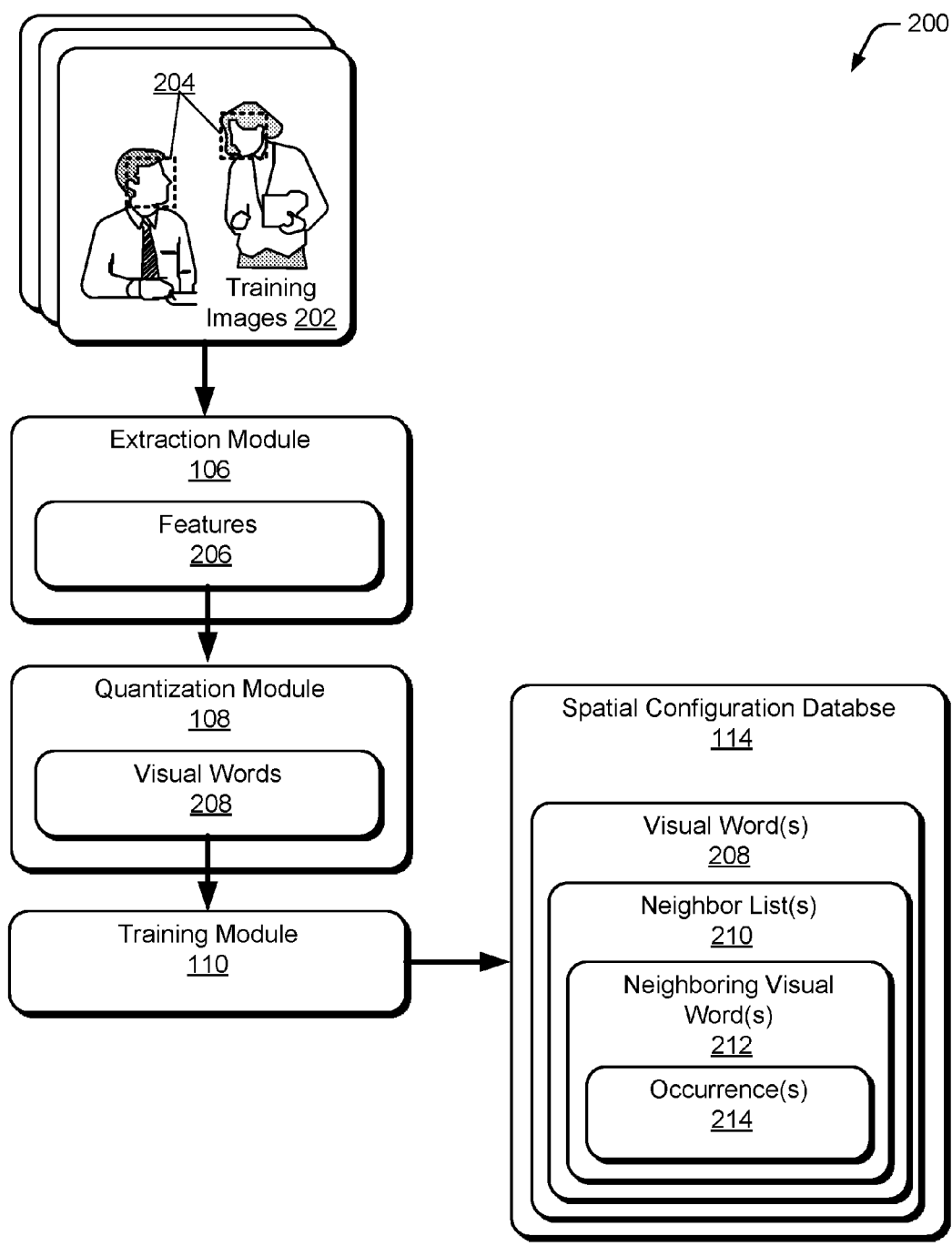
FIG. 2 illustrates a system in an example implementation in which the training module of FIG. 1 generates a spatial configuration database in a training stage.

FIG. 2 illustrates a system 200 in an example implementation in which training module 110 of FIG. 1 generates spatial configuration database 114 in a training stage.

To begin the training stage, a large number of training images 202 are collected. Training images 202 can be any type of digital image which can be displayed on a display device of a computing system or device. Each training image 202 can include varying features, objects, and regions of the image, and as described herein, faces 204 of one or more persons that are detectable in the image by object detection module 116. Training images 202 may include positive images that include a target object (e.g., faces 204), as well as negative images that do not include the target object.

Feature interpolation application 104 controls extraction module 106 to extract features 206 from training images 202. The extracted features 206 correspond to interesting points of training images 202 that can be extracted from each image to provide a feature description of the image. The feature description can be used to locate objects, such as faces 204, in the image when the image contains many other objects. In the testing stage, the extracted features may be dense features. In order to perform effective object recognition, it is important that the features 206 are detectable under changes in image scale, noise, and illumination. Accordingly, in one or more implementations, the features 206 extracted by extraction module 106 may be scale-invariant feature transform (SIFT) features. SIFT features are resilient to changes in image scale, rotation, noise, illumination, and changes in viewpoint.

Quantization module 108 receives the extracted features 206 from extraction module 106, and quantizes the extracted features 206 into visual words 208 using a feature vocabulary. The feature vocabulary is built by clustering a large amount of features which are extracted from a large number of example images. The features are then clustered such that similar features are clustered together. The center of each cluster is then selected as a visual word. Then, to quantize the extracted features 206, training module 110 represents each of extracted features 206 by the closest, or most similar, visual word in the feature vocabulary.

Training module 110 receives the visual words 208 from quantization module 108. Training module 110 then determines spatial configurations of the visual words 208 in the training images 202, and stores the spatial configurations in spatial configuration database 114. As described herein, the "spatial configuration" of visual words in a training image corresponds to the arrangement or structure of visual words in the training images 202. In some cases, training module 110 only stores spatial configurations that are determined for positive training images 202 that include an object.

In one or more implementations, to determine and store the spatial configurations of the visual words 208, training module 110 generates neighbor lists 210 for each visual word 208. Each neighbor list 210 includes neighboring visual words 212 of the visual word 208. As described herein, neighboring visual words 212 correspond to visual words that are positioned proximate (e.g., next to, above, below, and so on) the visual word 208 in training image 202. Each neighbor list 210 may also include the number of occurrences 214 of the neighboring visual words in the training images 202. Training module 110 stores neighbor lists 210 for each visual word 208 in spatial configuration database 114.

Training module 110 is configured to determine N neighboring visual words 212 for each visual word 208, where the value of N can vary. For example, in some cases, training module 110 determines 4 neighboring visual words 212 for each visual word 208 (e.g., a left neighboring visual word, a top neighboring visual word, a right neighboring visual word, and a bottom neighboring visual word). In other cases, training module 110 may determine 8 neighboring visual words 212 for each visual word 208 (e.g., a left neighboring visual word, a top-left neighboring visual word, a top neighboring visual word, a top-right neighboring visual word, a right neighboring visual word, a bottom-right neighboring visual word, a bottom neighboring visual word, and a bottom-left neighboring visual word). It is to be appreciated, however, that training module 110 can determine any number N of neighboring visual words 212 for each visual word 208.

Each neighbor list 210 includes neighboring visual words 212 at a certain position relative to the visual word 208 in the training images 202 (e.g., left, right, top, or bottom). Thus, training module 110 is configured to store N neighbor lists 210 of neighboring visual words 212 for each visual word 208. For example, if training module 110 determines 4 neighboring visual words 212, then training module 110 generates and stores 4 neighbor lists 210 (e.g., a left neighbor list, a top neighbor list, a right neighbor list, and a bottom neighbor list).

Figure 3:
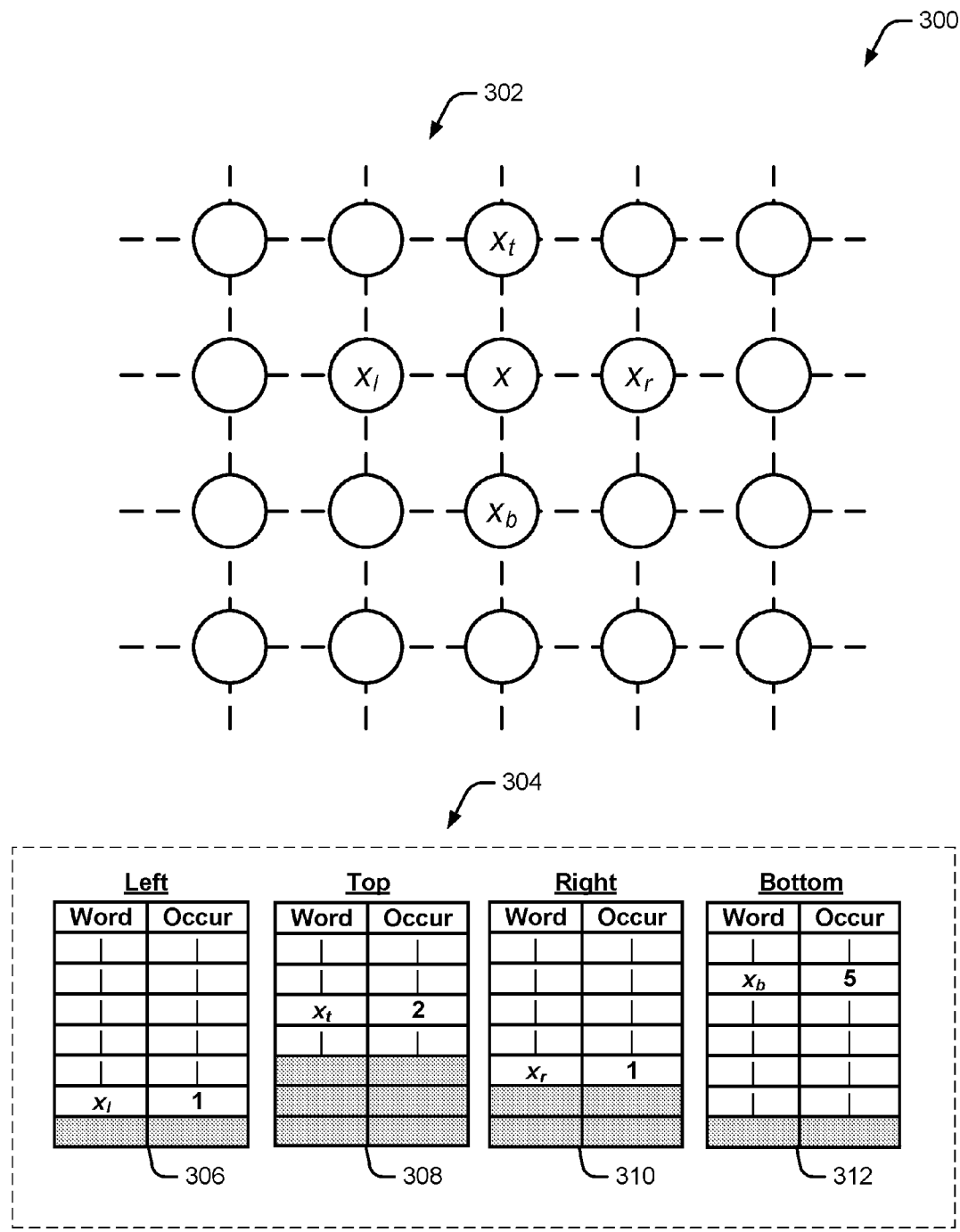
FIG. 3 illustrates an example 300 of generating neighbor lists for a visual word in a training stage.

Consider, for example, FIG. 3 which illustrates an example 300 of generating neighbor lists for a visual word in a training stage. Example 300 illustrates a portion of a training image 302 that includes multiple visual words that are each represented by a circle. In this example, the visual words include a visual word "x", as well as neighboring visual words of visual word x. The neighboring visual words include a left neighboring visual word $x_l$, a top neighboring visual word $x_t$, a right neighboring visual word $x_r$, and a bottom neighboring visual word $x_b$.

Example 300 also illustrates neighbor lists 304 of visual word x, which can be generated by training module 110 and stored in spatial configuration database 114. In this example, the neighbor lists 304 of visual word x include a left neighbor list 306, a top neighbor list 308, a right neighbor list 310, and a bottom neighbor list 312.

Training module 110 determines the neighboring visual words of visual word x, which in this case includes left neighboring visual word $x_l$, top neighboring visual word $x_t$, right neighboring visual word $x_r$, and bottom neighboring visual word $x_b$. Then, training module 110 stores the neighboring visual words of visual word x in neighbor lists 304. To do so, training module 110 stores the left neighboring visual word $x_l$ in the left neighbor list 306, stores the top neighboring visual word $x_t$ in the top neighbor list 308, stores the right neighboring visual word $x_r$ in the right neighbor list 310, and stores the bottom neighboring visual word $x_b$ in the bottom neighbor list 312.

When storing a neighboring visual word 212, training module 110 determines if the neighboring visual word 212 is listed in a corresponding neighbor list 210 of the visual word 208. If the neighboring visual word 212 is not already listed, training module 110 creates a new entry for the neighboring visual word 212 in the corresponding neighbor list 210 and sets a corresponding occurrence value to 1. For instance, in example 300 training module 110 determines that this is the first time that visual words $x_l$ and $x_r$ are neighboring visual words of visual word x because they have not yet been listed in left neighbor list 306 or right neighbor list 310, respectively. As such, training module 110 creates a new entry for neighboring visual words $x_l$ and $x_r$ in left neighbor list 306 and right neighbor list 310, and sets the corresponding occurrence values to 1 in each respective list.

Alternately, if the neighboring visual word is already listed, training module 110 increases the corresponding occurrence value by 1. For instance, in example 300 training module 110 determines that visual words $x_t$ and $x_b$ have already been listed in top neighbor list 308 and bottom neighbor list 312, respectively. As such, training module 110 updates the occurrence values of $x_t$ and $x_b$ to 2 and 5, respectively.

The neighbor lists 210 are accumulated through all of the training images 202, and stored after training in spatial configuration database 114. As will be described in more detail below, interpolation module 112 can access the spatial configuration database 114 to interpolate features.

Feature Interpolation

Figure 4:
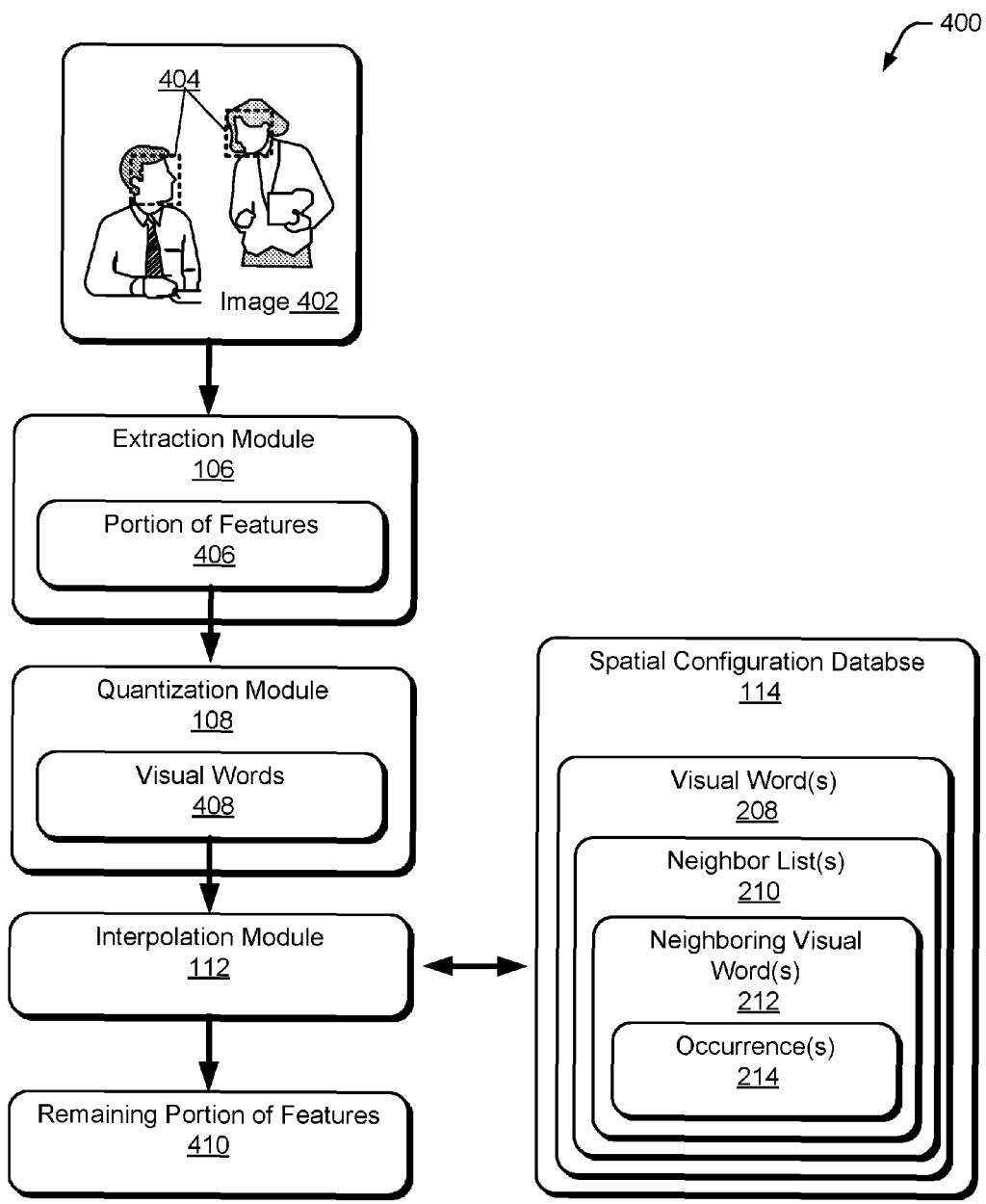
FIG. 4 illustrates a system in an example implementation in which the interpolation module of FIG. 1 interpolates features for an image.

FIG. 4 illustrates a system 400 in an example implementation in which interpolation module 112 of FIG. 1 interpolates features for an image.

To begin, feature interpolation application 104 receives an image 402. Image 402 can be any type of digital images, which can be displayed on a display device of a computing system or device. Image 402 can include varying features, objects, and regions of the image, and as described herein, faces 404 of one or more persons that are detectable in the image by interpolation module 112.

In accordance with various implementations, feature interpolation application 104 controls extraction module 106 to extract a portion of features 406 of image 402 from image 402. As described herein, a portion of features 406 corresponds to less than all of the original features that may be extracted from image 402. For example, in some cases extraction module 106 is controlled to extract approximately 50% of the original features of image 402 (e.g., one out of every two features). Alternately, extraction module 106 can be controlled to extract approximately 25% of the original features of image 402 (e.g., one out of every four features). Extraction module 106 can be controlled to extract features at multiple scale levels from image 402. For example, in one or more implementations, to extract 25% of the features, extraction module 106 may extract features at the finest scale (scale 0). Alternately, to extract 50% of the features, extraction module 106 may extract features at scale 1. It is to be appreciated, however, that extraction module 106 may be controlled to by interpolation application 104 to extract features at any scale.

The extracted features 406 correspond to interesting points of image 402 that can be extracted from the image to provide a feature description of the image (e.g., SIFT features). The feature description can be used to locate an object, such as faces 404, in the image 402.

Quantization module 108 receives the portion of extracted features 406, and quantizes the portion of extracted features into visual words 408 using the feature vocabulary, as described above.

Then, interpolation module 112 interpolates a remaining portion of features 410 of image 402 using the visual words 408 and the spatial configurations of visual words generated from the collection of training images 202 and stored in spatial configuration database 114. As described herein, the remaining portion of features 410 corresponds to features of image 402 that are not extracted by extraction module 106. For example, if extraction module 106 extracts 50% of the features, then interpolation module 112 interpolates the remaining 50% of features of image 402. As another example, if extraction module 106 extracts 25% of the features, then interpolation module 112 interpolates the remaining 75% of features of image 402.

In one or more implementation, to interpolate a remaining feature, interpolation module 112 accesses neighbor lists 210 of neighboring visual words 212 that are neighbors of the remaining feature in the image 402 from the spatial configuration database 114. Then, interpolation module 112 determines a common visual word that is included in at least two neighbor lists of the neighboring visual words, and interpolates the feature using the common visual world.

Figure 5:
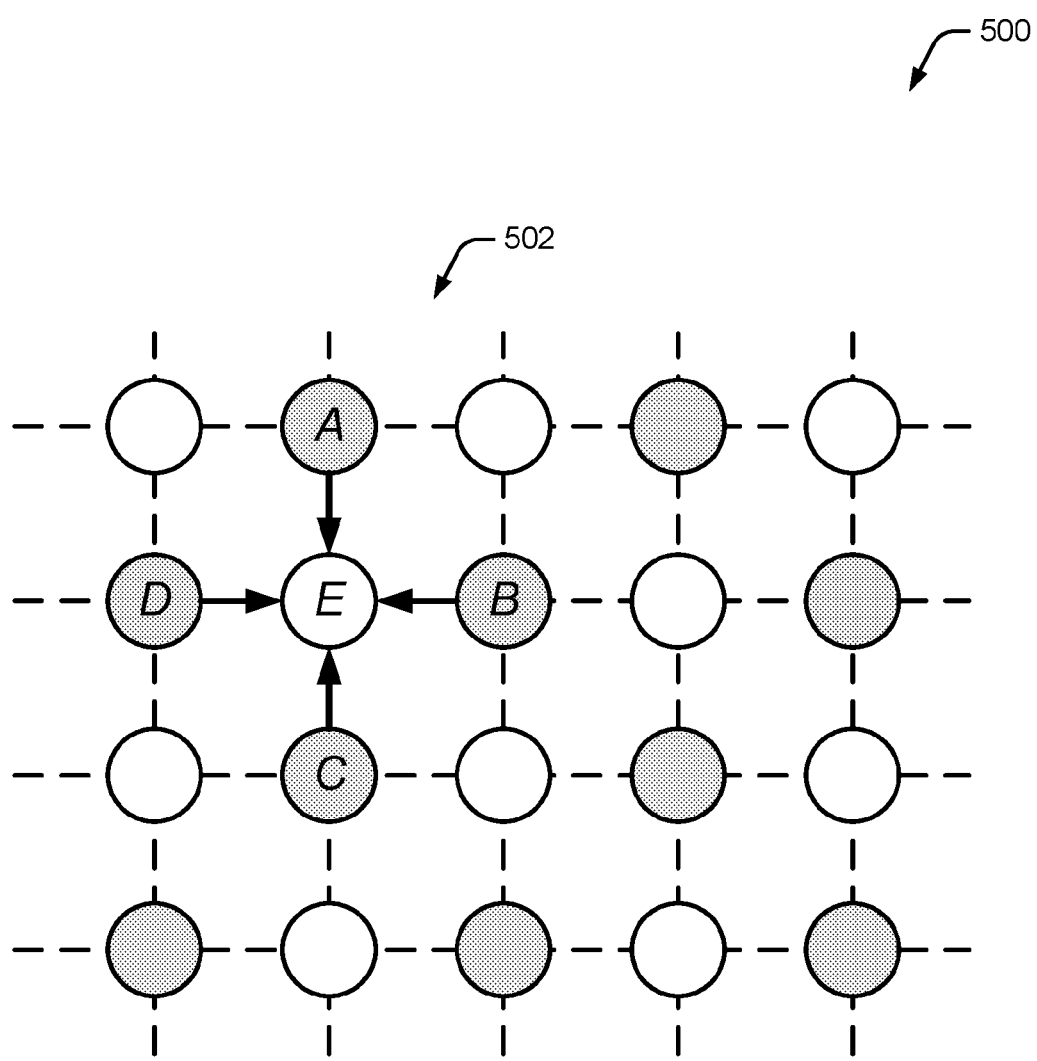
FIG. 5 illustrates an example of interpolating features based on extracted features.

Consider, for example, FIG. 5 which illustrates an example 500 of interpolating features based on extracted features. Example 500 illustrates a portion of an image 502 that includes multiple visual words that are each represented by a circle. In this example, 50% of the features have been extracted, and the corresponding visual words of the extracted features are represented by gray circles. The extracted visual words include visual words A, B, C, and D. The white circles represent the remaining features which have not been extracted. The remaining features includes visual word E. Based on the extracted features, interpolation module 112 can interpolate the remaining features using neighbor lists 210. For example, based on visual words A, B, C, and D, interpolation module 112 can interpolate visual word E, which corresponds to a remaining feature which has not been extracted.

Thus, in order to interpolate the remaining feature E, interpolation module 112 accesses neighbor lists of neighboring visual words that are neighbors of the remaining feature E in the image from the spatial configuration database 114. In this example, interpolation module accesses a right neighbor list associated with left neighboring visual word D positioned to the left of the remaining feature E in the image 502, accesses a bottom neighbor list associated with top neighboring visual word A positioned above the remaining feature E in the image 502, accesses a left neighbor list associated with right neighboring visual word B positioned to the right of the remaining feature E in the image 502, and accesses a top neighbor list associated with bottom neighboring visual word C positioned below the remaining feature E in the image 502.

Next, interpolation module 112 determines a common visual word that is included in at least two neighbor lists of the neighboring visual words that are neighbors of the remaining feature E in the image 502. It is to be appreciated, that in practice there are often quantization errors when quantizing features to visual words, and thus it may be rare for a visual word to appear in each of the neighbor lists. Thus, interpolation module 112 may find a common visual word, and interpolate the common visual word, if the visual word appears in two or more neighbor lists. Of course, the common visual word that appears in the most neighbor lists will be selected. For example, if a first visual word appears in two neighbor lists, and a second visual word appears in three neighbor lists, interpolation module 112 will select the second visual word as the common visual word.

In example 500, interpolation module 112 determines the common visual word by determining a visual word that is in two or more of the right neighbor list of the left neighboring visual word D, the bottom neighbor list of the top neighboring visual word A, the left neighbor list of the right neighboring visual word B, and the top neighbor list of the bottom neighboring visual word C. Interpolation module 112 then interpolates the remaining feature using the common visual word. For example, if the visual word E is included in the bottom neighbor list of A, in the left neighbor list of B, the top neighbor list of C, and also the right neighbor list of D, it is very possible that A, B, C and D as well as E appear concurrently in certain regions of image 402. Thus, the missing feature in the center is very likely to be E.

In some instances, interpolation module 112 may determine multiple common visual words that are included in the same number of neighbor lists. In these instances, interpolation module 112 may select the common visual word with a highest total occurrence value. For example, if visual words E and F each occur in three neighbor lists, but visual word E has a total occurrence value of 50 (e.g., the sum of the occurrences 214), and visual word F has a total occurrence value of 40, then interpolation module 112 will select visual word E as the common visual word.

In other instances, interpolation module 112 may determine that there are no common visual words, which may indicate that no similar spatial configurations were collected in the training stage by training module 110. Since training module 110 may only store spatial configurations for positive training images that include an object, it is highly unlikely that the current test region is an object region. Thus, interpolation module 112 may not interpolate a feature to avoid introducing false positives.

As mentioned above, in some cases interpolation module 112 may control extraction module to extract 25% of the features of image 402. In these instances, interpolation module 112 can interpolate the remaining 75% of the features. To do so, in the training stage, training module 110 stores not only the 4-neighbor lists of the visual words, but also the 8-neighbor lists (e.g., a left neighboring visual word, a top-left neighboring visual word, a top neighboring visual word, a top-right neighboring visual word, a right neighboring visual word, a bottom-right neighboring visual word, a bottom neighboring visual word, and a bottom-left neighboring visual word).

Then in the detection stage, interpolation module 112 controls extraction module 106 to extract 25% of the features 406 of image 402. To do so, extraction module 106 can extract the features 406 with a doubled sampling step length. Next, interpolation module 112 interpolates the remaining 75% of the features using a two-stage interpolation process. In a first stage, interpolation module 112 interpolates a first subset of the remaining features based on the visual words of the extracted features. Then, in a second stage, interpolation module 112 interpolates a second subset of the remaining features based on the visual words of the extracted features and the interpolated first subset of remaining features.

Figure 6:
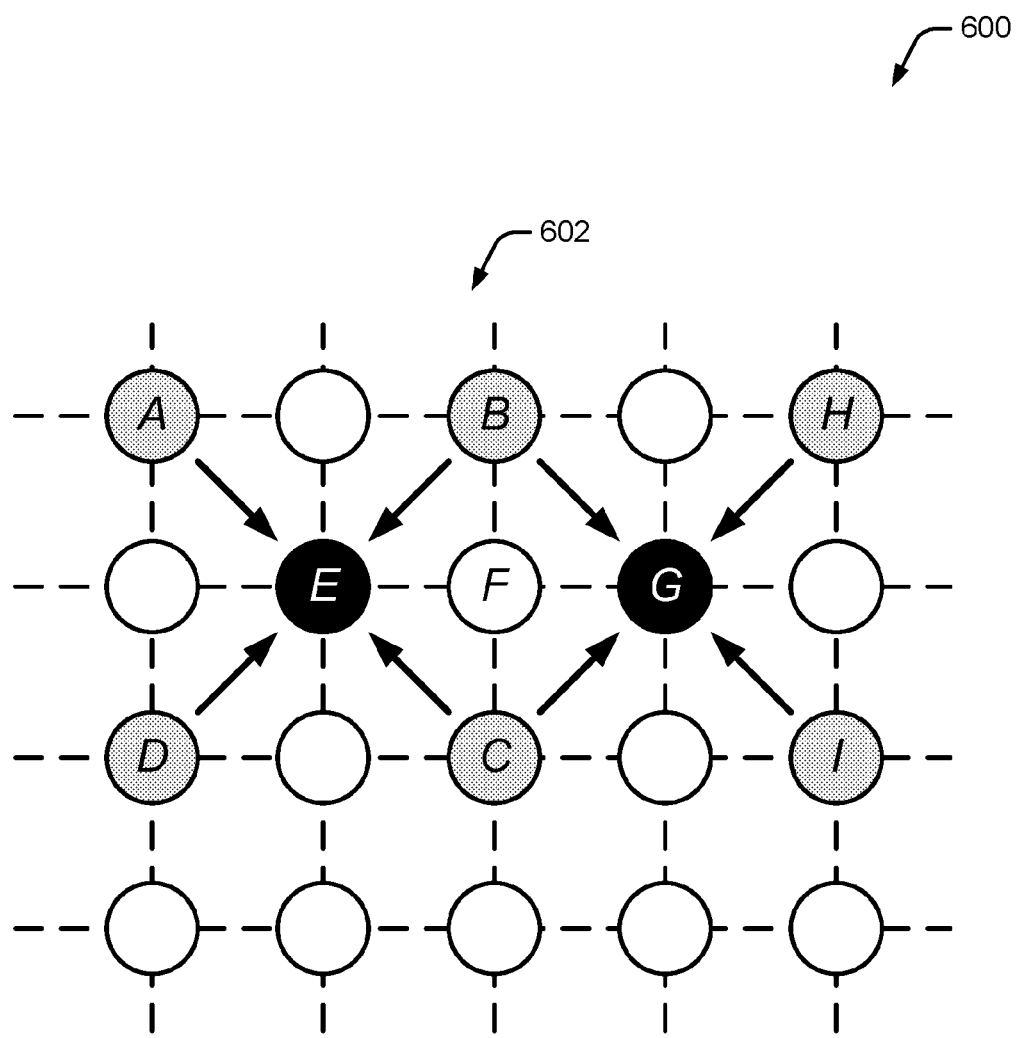
FIG. 6 illustrates an additional example of interpolating features based on extracted features.

Consider, for example, FIG. 6 which illustrates an additional example 600 of interpolating features based on extracted features. Example 600 illustrates a portion of an image 602 that includes multiple visual words that are each represented by a circle. In this example, 25% of the features have been extracted, and the corresponding visual words of the extracted features are represented by gray circles. The extracted visual words, in this example, include visual words A, B, C, D, H, and I.

In a first stage of the interpolation process, interpolation module 112 interpolates a first subset of the remaining features, represented by the black circles in FIG. 6, using each remaining feature's diagonally-positioned neighbors. For example, interpolation module 112 interpolates the visual word E by determining the common visual word from the bottom-right neighbor list of the visual word A, the bottom-left neighbor list of the visual word B, the top-left neighbor list of the visual word C, and the top-right neighbor list of the visual word D. Similarly, interpolation module 112 interpolates the visual word G by determining the common visual word from the bottom-right neighbor list of the visual word B, the bottom-left neighbor list of the visual word H, the top-left neighbor list of the visual word I, and the top-right neighbor list of the visual word C.

In the second stage, interpolation module 112 uses the extracted features (e.g., A, B, C, D, H, and I) and the interpolated features of the first stage (e.g., E and G) to interpolate a second subset of the remaining features, represented by the white circles, using the same interpolation process described with regards to FIG. 5, above.

For example, interpolation module 112 interpolates the visual word F by determining the common visual word from the right neighbor list of the interpolated visual word E, the bottom neighbor list of the extracted visual word B, the left neighbor list of the interpolated visual word G, and the top neighbor list of the extracted visual word C.

After interpolating features 410, the extracted features 406 and the interpolated features 410 can be passed to object detection module 116. Object detection module 116 then detects one or more objects (e.g., faces 404) in image 402 based on the extracted features 406 and the interpolated features 410. Accordingly, it is to be appreciated that interpolation module 112 causes a great increase in efficiency and speed by enabling less features, e.g., 50% or 25% of the original features to be extracted, while still enabling accurate object detection.

Implementation Example

Figure 7:
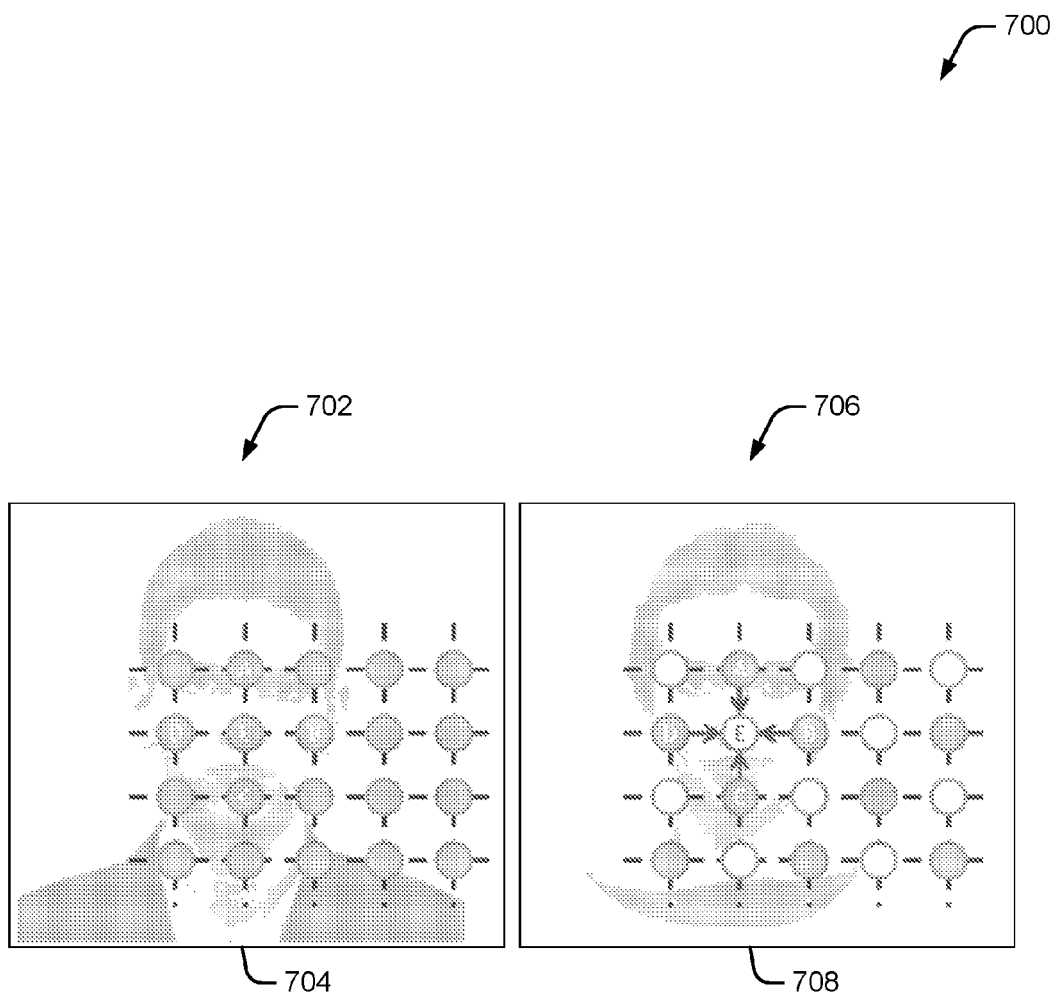
FIG. 7 illustrates an implementation example of detecting an object in an image based on extracted features and interpolated features.

FIG. 7 illustrates an implementation example 700 of detecting an object in an image based on extracted features and interpolated features. In this example, in a training stage 702, features are extracted from a training image 704, which in this example includes a face. The extracted features are then quantized into visual words, which include visual words A, B, C, D, and E. Next, training module 110 stores the spatial configurations of visual words A, B, C, D, and E in spatial configuration database 114.

At 706, feature interpolation application 104 receives an image 708, which includes a similar face to the face in training image 704. Next, interpolation module 112 controls extraction module 106 to extract a portion of the features from image 708, which are indicated as shaded in circles. The extracted portion of features are then quantized into visual words, which include visual words A, B, C, and D. Finally, interpolation module 112 interpolates a remaining portion of the features in image 708 using visual words A, B, C, and D and the spatial configuration of visual words A, B, C, D, and E generated from training image 704. In this example, interpolation module 112 interpolates visual word E. For example, on a similar face, the structure of A, B, C, and D can be found, and used to successfully interpolate visual word E on the nose of the face in image 708 without actually extracting the corresponding feature.

The extracted features and the interpolated features are then passed to object detection module 116 to enable detection of the face in image 708 based on the extracted features and the interpolated features of image 708.

Example Procedures

The following discussion describes feature interpolation techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, and the system 400 of FIG. 4.

Figure 8:
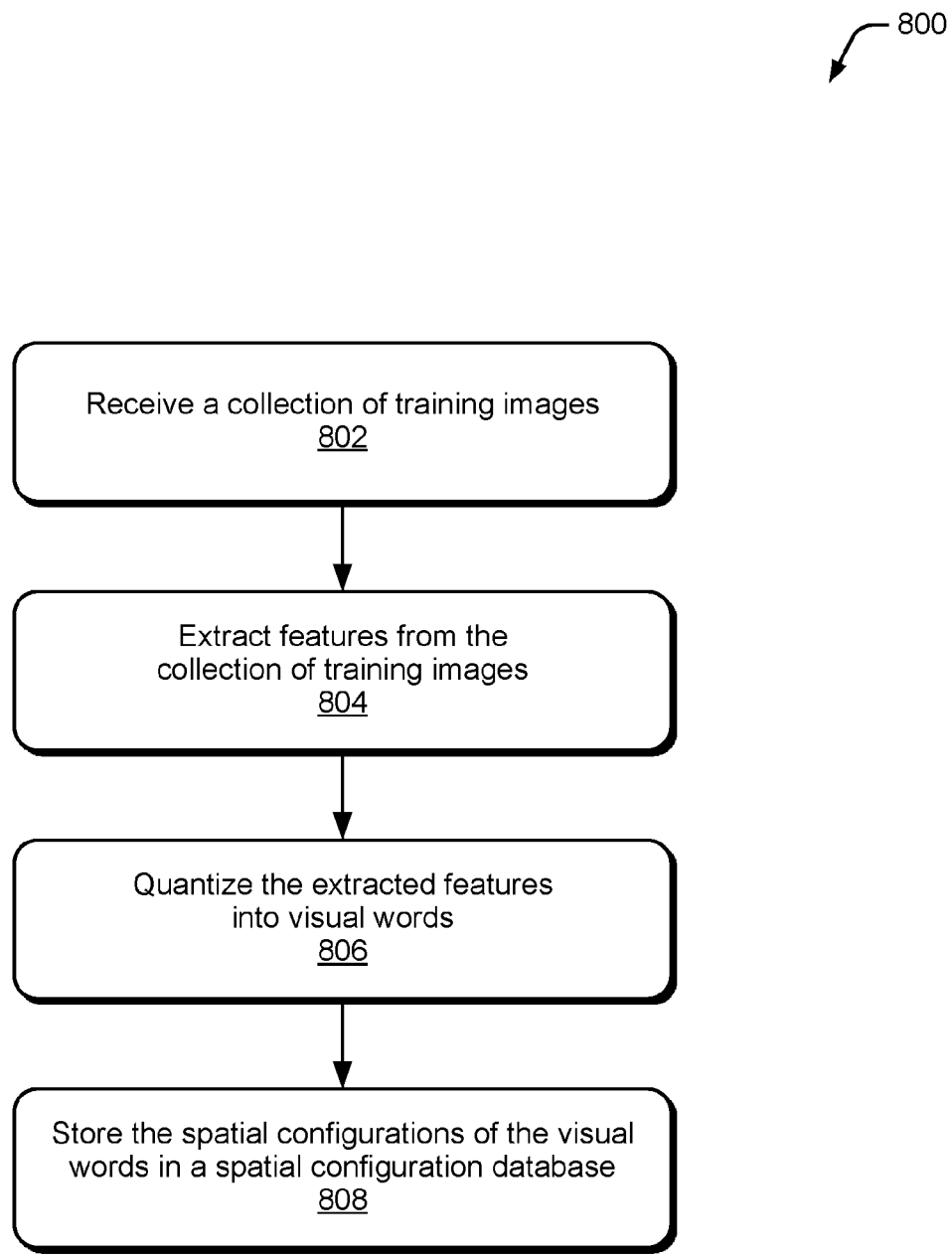
FIG. 8 illustrates a procedure in an example implementation in which a training module is used to store spatial configurations of visual words in a spatial configuration database.

FIG. 8 illustrates a procedure 800 in an example implementation in which a training module is used to store spatial configurations of visual words in a spatial configuration database.

At 802, a collection of training images is received. For example, feature interpolation module 104 (FIG. 1) receives a collection of training images 202 (FIG. 2).

At 804, features are extracted from the collection of training images. For example, extraction module 106 extracts features 206 from the collection of training images 202.

At 806, the extracted features are quantized into visual words. For example, quantization module 108 quantizes the extracted features 206 into visual words 208.

At 808, the spatial configurations of the visual words are stored in a spatial configuration database. For example, training module 110 stores the spatial configurations of visual words 208 in spatial configuration database 114. As described herein, the "spatial configuration" of visual words in training images corresponds to the arrangement of visual words in the training images.

In one or more implementations, to determine and store the spatial configurations of the visual words 208, training module 110 generates neighbor lists 210 for each visual word. Each neighbor list 210 includes neighboring visual words 212 of the visual word 208. As described herein, neighboring visual words 212 correspond to visual words that are positioned proximate (e.g., next to, above, below, and so on) the visual word 208 in training image 202. Each neighbor list 210 may also include the number of occurrences 214 of the neighboring visual words in the training images 202. Training module 110 stores neighbor lists 210 for each visual word 208 in spatial configuration database 114.

Figure 9:
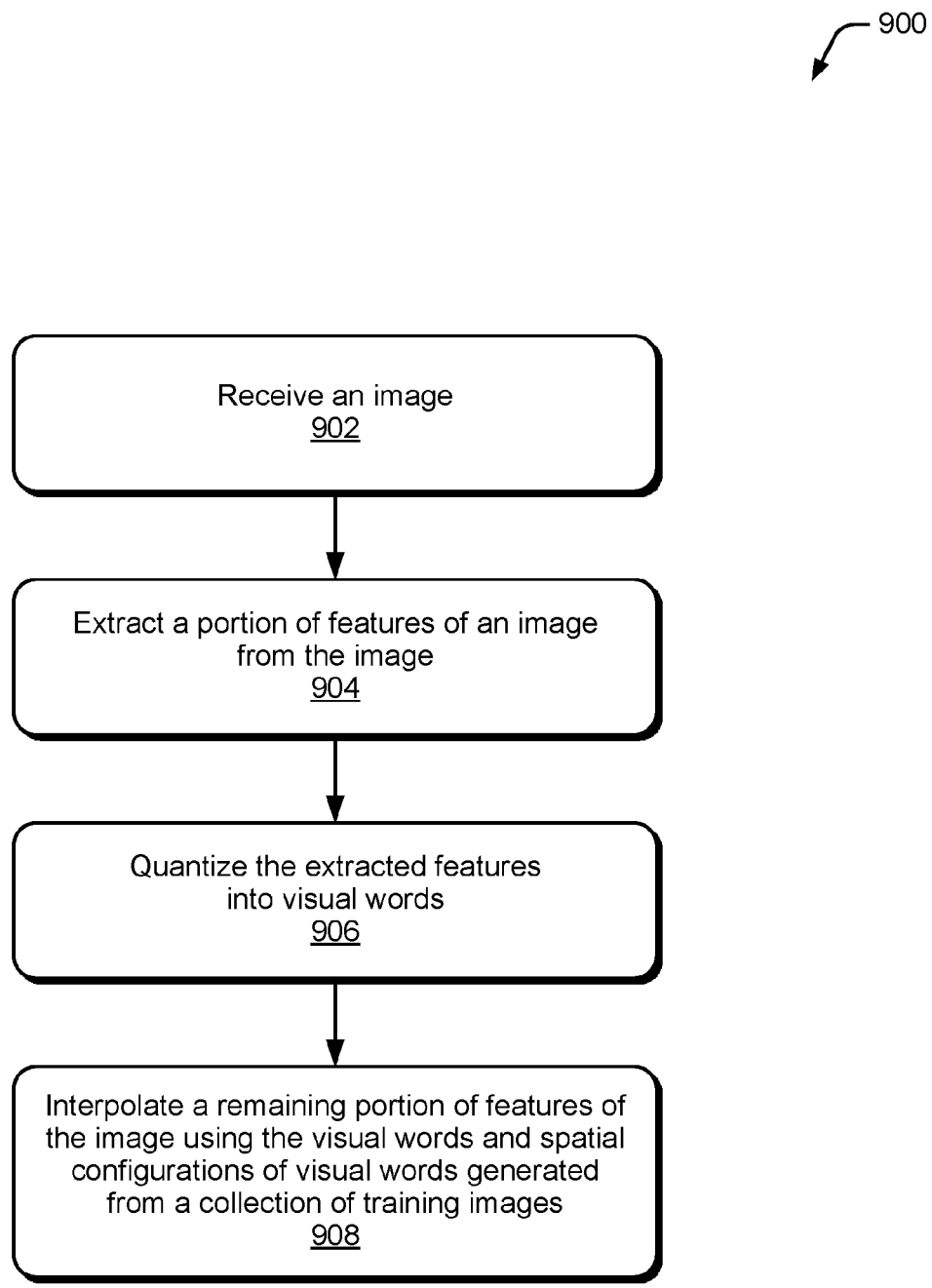
FIG. 9 illustrates a procedure in an example implementation in which a feature interpolation module is used to interpolate features based on extracted features.

FIG. 9 illustrates a procedure 900 in an example implementation in which a feature interpolation module is used to interpolate features based on extracted features.

At 902, an image is received. For example, feature interpolation application 104 (FIG. 1) receives an image 402 (FIG. 4).

At 904, a portion of features of an image are extracted from the image.

For example, interpolation module 112 controls extraction module 106 to extract a portion of features 406 of image 402 from the image 402. Extraction module 106 can be controlled to extract features at multiple scale levels from image 402. For example, to extract 25% of the features, extraction module 106 extracts features at the finest scale (scale 0). Alternately, to extract 50% of the features, extraction module 106 extracts features at scale 1.

At 906, the extracted features are quantized into visual words. For example, quantization module 108 quantizes the extracted portion of features 406 into visual words 408.

At 908, a remaining portion of features of the image are interpolated using the visual words and spatial configurations of visual words generated from a collection of training images. For example, interpolation module 112 interpolates a remaining portion of features 410 using visual words 408 and spatial configurations of visual words generated from the collection of training images 202 and stored in spatial configuration database 114.

The remaining portion of features 410 corresponds to features of image 402 that are not extracted by extraction module 106. For example, if extraction module 106 extracts 50% of the features, then interpolation module 112 interpolates the remaining 50% of features of image 402. As another example, if extraction module 106 extracts 25% of the features, then interpolation module 112 interpolates the remaining 75% of features of image 402.

In some cases, to interpolate a remaining feature, interpolation module 112 accesses neighbor lists 210 of neighboring visual words 212 that are neighbors of the remaining feature in the image 402 from the spatial configuration database 114. Then, interpolation module 112 determines a common visual word that is included in two or more neighbor lists of the neighboring visual words, and interpolates the feature using the common visual world.

Having described example procedures in accordance with one or more implementations, consider now an example system and device that can be utilized to implement the various techniques described herein.

Example System and Device

FIG. 10 illustrates an example system generally at 1000 that includes an example computing device 1002 that is representative of one or more computing systems and/or devices that may implement the various techniques described herein. This is illustrated through inclusion of feature interpolation application 104, which operates as described above. The computing device 1002 may be, for example, a server of a service provider, a device associated with a client (e.g., a client device), an on-chip system, and/or any other suitable computing device or computing system.

The example computing device 1002 is illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device implementation, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A computer-implemented method comprising:
receiving a collection of training images;
extracting features from the collection of training images;
quantizing the extracted features into visual words;
determining spatial configurations of the visual words in the training images;
storing the spatial configurations of the visual words in a spatial configuration database; and
extracting a portion of features of an image and utilizing the spatial configurations of the visual words stored in the spatial configuration database to interpolate a remaining portion of features of the image.
2. The computer-implemented method of claim 1, wherein the determining the spatial configurations of the visual words comprises, for each visual word, determining neighboring visual words.
3. The computer-implemented method of claim 2, wherein the storing the spatial configurations of the visual words comprises, for each visual word, storing the neighboring visual words in neighbor lists that are associated with the visual word in the spatial configuration database.
4. The computer-implemented method of claim 3, wherein each neighbor list includes an occurrence field that indicates a number of occurrences of the neighboring visual word in the training images.
5. The computer-implemented method of claim 4, wherein the storing the neighboring visual words in the neighbor lists further comprises, for each neighboring visual word:

determining if the neighboring visual word is listed in a corresponding neighbor list of the visual word;

if the neighboring visual word is listed in the corresponding neighbor list of the visual word, increasing a corresponding occurrence value by 1;

if the neighboring visual word is not listed in the corresponding neighbor list of the visual word, creating a new entry for the neighboring visual word in the corresponding neighbor list and setting a corresponding occurrence value to 1.

6. The computer-implemented method of claim 3, wherein:

the determining neighboring visual words, comprises determining N neighboring visual words for each visual word; and the storing the neighboring visual words comprises, for each visual word, storing N lists of neighboring visual words, wherein each of the N lists comprises a list of neighboring visual words at a certain position relative to the visual word in the training images.

7. The computer-implemented method of claim 3, wherein:

the determining neighboring visual words, comprises, for each visual word, determining left neighboring visual words, top neighboring visual words, right neighboring visuals words, and bottom neighboring visual words; and the storing the neighboring visual words comprises, storing the left neighboring visual words in a left neighbor list, storing the top neighboring visual words in a top neighbor list, storing the right neighboring visual words in a right neighbor list, and storing the top neighboring visual words in a bottom neighbor list.

8. The computer-implemented method of claim 3, wherein the training images include positive images that include a target object.

9. A system comprising:

an extraction module configured to receive a collection of training images, and extract features from the collection of training images;

a quantization module configured to quantize the extracted features into visual words;

a training module configured to determine spatial configurations of the visual words in the training images;

a spatial configuration database configured to store the spatial configurations of the visual words; and an interpolation module configured to extract a portion of features of an image and utilize the spatial configurations of the visual words stored in the spatial configuration database to interpolate a remaining portion of features of the image.

10. The system of claim 9, wherein the training module is configured to determine the spatial configurations of the visual words by determining, for each visual word, neighboring visual words.

11. The system of claim 10, wherein the spatial configuration database is configured to store, for each visual word, the neighboring visual words in neighbor lists that are associated with the visual word.

12. The system of claim 11, wherein each neighbor list in the spatial configuration database includes an occurrence field that indicates a number of occurrences of the neighboring visual word in the training images.

13. The system of claim 12, wherein the training module is further configured to:

determine if the neighboring visual word is listed in a corresponding neighbor list of the visual word;

if the neighboring visual word is listed in the corresponding neighbor list of the visual word, increasing a corresponding occurrence value by 1;

if the neighboring visual word is not listed in the corresponding neighbor list of the visual word, creating a new entry for the neighboring visual word in the corresponding neighbor list and setting a corresponding occurrence value to 1.

14. The system of claim 11, wherein:

the training module is configured to determine neighboring visual words by determining N neighboring visual words for each visual word; and the spatial configuration database is configured to store N lists of neighboring visual words, wherein each of the N lists comprises a list of neighboring visual words at a certain position relative to the visual word in the training images.

15. The system of claim 11, wherein:

the training module is configured to determine neighboring visual words by determining left neighboring visual words, top neighboring visual words, right neighboring visuals words, and bottom neighboring visual words; and the spatial configuration database is configured to store the left neighboring visual words in a left neighbor list, store the top neighboring visual words in a top neighbor list, store the right neighboring visual words in a right neighbor list, and store the top neighboring visual words in a bottom neighbor list.

16. The system of claim 11, wherein the training images include positive images that include a target object.

17. One or more computer-readable storage devices comprising instructions stored thereon that, responsive to execution by one or more processors, perform operations comprising:

receiving a collection of training images;

extracting features from the collection of training images;

quantizing the extracted features into visual words;

determining spatial configurations of the visual words in the training images;

storing the spatial configurations of the visual words in a spatial configuration database; and extracting a portion of features of an image and utilizing the spatial configurations of the visual words stored in the spatial configuration database to interpolate a remaining portion of features of the image.

18. The one or more computer-readable storage devices of claim 17, wherein the determining the spatial configurations of the visual words comprises, for each visual word, determining neighboring visual words.

19. The one or more computer-readable storage devices of claim 18, wherein the storing the spatial configurations of the visual words comprises, for each visual word, storing the neighboring visual words in neighbor lists that are associated with the visual word in the spatial configuration database.

20. The one or more computer-readable storage devices of claim 19, wherein each neighbor list includes an occurrence field that indicates a number of occurrences of the neighboring visual word in the training images.

* * * * *